United States Patent

Gowing

[11] Patent Number: 5,875,584
[45] Date of Patent: Mar. 2, 1999

[54] FISH HOOK

[75] Inventor: James R. Gowing, Altus, Ark.

[73] Assignee: EBSCO Industries, Inc., Birmingham, Ala.

[21] Appl. No.: 680,461

[22] Filed: Jul. 15, 1996

[51] Int. Cl.⁶ ................................................. A01K 83/00
[52] U.S. Cl. ........................................................... 43/44.82
[58] Field of Search ............................... 43/42.7, 44.82, 43/43.4, 43.16

[56] References Cited

U.S. PATENT DOCUMENTS

| | | |
|---|---|---|
| D. 276,360 | 11/1984 | Sitton . |
| 377,033 | 1/1888 | Kerrison . |
| 512,746 | 1/1894 | Payson . |
| 626,777 | 6/1899 | Slotterbeck ............... 43/42.7 |
| 699,711 | 5/1902 | Pyott . |
| 828,505 | 8/1906 | Rice . |
| 842,594 | 1/1907 | Van Vleck . |
| 1,283,718 | 11/1918 | Ford . |
| 1,357,678 | 11/1920 | Bain . |
| 2,054,335 | 9/1936 | Nelson . |
| 2,210,271 | 8/1940 | Thwaits ..................... 43/42.7 |
| 2,233,863 | 3/1941 | Driscoll . |
| 2,334,613 | 11/1943 | Dunkelberger et al. . |
| 2,379,886 | 7/1945 | De Witt et al. . |
| 2,490,583 | 12/1949 | Dunkelberger . |
| 2,520,544 | 8/1950 | Hook ......................... 43/42.7 |
| 2,531,981 | 11/1950 | Liebe . |
| 2,608,791 | 9/1952 | Wentz . |
| 2,624,146 | 1/1953 | Kahle . |
| 2,703,947 | 3/1955 | Petrasek ................... 43/44.82 |
| 2,749,652 | 6/1956 | Slane ....................... 43/44.82 |
| 3,092,412 | 6/1963 | Drake ...................... 43/44.82 |
| 4,060,928 | 12/1977 | Messler et al. . |
| 4,283,877 | 8/1981 | Onstott et al. . |
| 4,384,426 | 5/1983 | Steeve ..................... 43/44.82 |
| 4,835,898 | 6/1989 | Pond . |
| 4,905,402 | 3/1990 | Clark . |
| 4,965,957 | 10/1990 | Hnizdor . |
| 5,115,594 | 5/1992 | Gowing . |

FOREIGN PATENT DOCUMENTS 549166  4/1932  Germany ............... 43/44.82

Primary Examiner—Kurt Rowan
Attorney, Agent, or Firm—Kenneth M. Bush; Veal & Associates

[57] ABSTRACT

An improved quad fish hook having alternating planar bights and offset bights forming upturned hooks. The fish hook has an enlarged shank for greater hooking and holding strength, and an eyelet offset from the plane of each hook to equalize pressure on any hook point when a strike occurs.

15 Claims, 1 Drawing Sheet

FISH HOOK

FIELD OF THE INVENTION

The present invention relates to fish hooks. More particularly, the present invention relates to an improved quad fish hook.

BACKGROUND OF THE INVENTION

The fish hook is one of the oldest tools used in fishing and various types of hooks are known in the art. Typically, fish hooks are comprised of at least one hook having a bight portion with a point and barb at one end. The bight portions of standard fish hooks are substantially planar; however, fish hooks having an offset bight portion are known. The offset feature of the bight portion can hinder the fish from expelling the hook once impaled. An example of an offset treble hook is U.S. Pat. No. 5,115,594 to the present inventor.

The prior art does not teach of a quad fish hook which utilizes both the standard planar hook and the offset hook. Thus, there is a need for a quad fish hook which gives the fisherman the choice of a standard planar hook and an offset hook on the same fish hook.

SUMMARY OF THE INVENTION

It is the object of the present invention to provide an improved quad fish hook having alternating offset hooks and planar hooks.

It is another object of the present invention to provide an improved quad fish hook having an enlarged shank for greater hooking and holding strength.

It is a further object of the present invention to provide an improved quad fish hook having an eyelet offset from the plane of each hook to equalize pressure on any hook point when a strike occurs.

These and other objects of the invention are accomplished through an improved quad fish hook having alternating standard planar bights and offset bights. The fish hook has an enlarged shank for greater hooking and holding strength, and an eyelet offset from the plane of each hook to equalize pressure on any hook point when a strike occurs.

These and other objects and advantages of the invention will become apparent from the following detailed description of the preferred embodiment of the invention.

BRIEF DESCRIPTION OF THE DRAWINGS

A quad fish hook embodying features of the invention is described in the accompanying drawings which form a portion of this disclosure and wherein.

DETAILED DESCRIPTION OF THE PREFERRED EMBODIMENT

Figure 1:
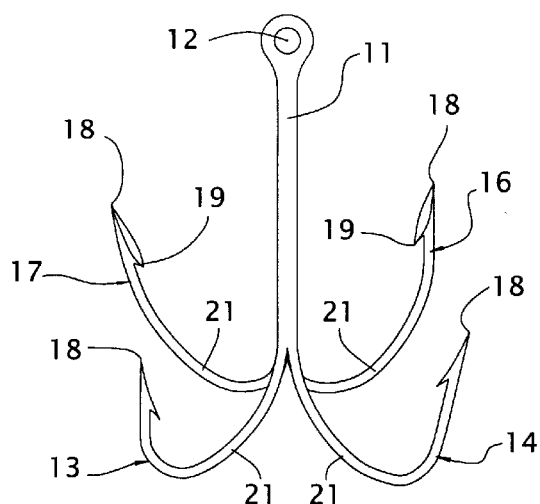
FIG. 1 is a perspective view of the present invention.

A more complete understanding of the invention may be obtained by reference to the accompanying drawings wherein the fish hook comprises a shank 11 having a substantially planar eyelet 12 on one end for attachment of a fishing line (not shown). The opposite end of shank 11 splits into four prongs equally spaced from the shank. A first prong 13 is a standard straight hook which is substantially planar. A second prong 14 is a hook offset in a counterclockwise, rotating manner. A third prong 16 is a standard straight hook equivalent to first prong 13, and a fourth prong 17 is an offset hook equivalent to second prong 14. Thus, the fish hook is comprised of alternating planar hooks and offset hooks.

Figure 2:
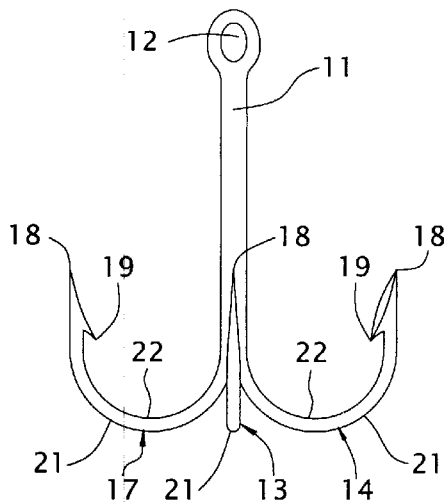
FIG. 2 is a side view along line 2—2 of FIG. 3.
Figure 3:
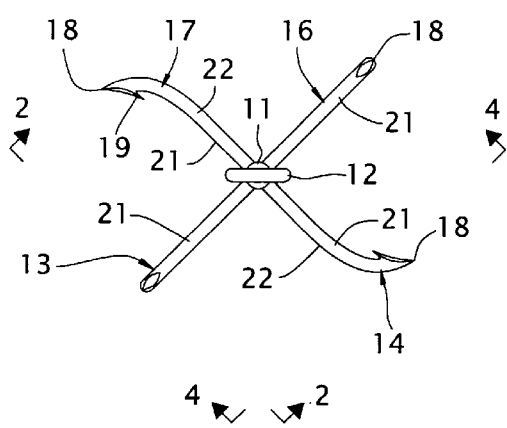
FIG. 3 is a top plan view of the present invention.
Figure 4:
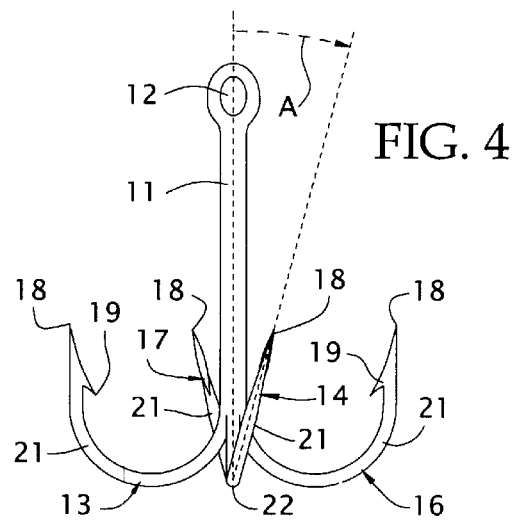
FIG. 4 is a side view along line 4—4 of FIG. 3.
Figure 5:
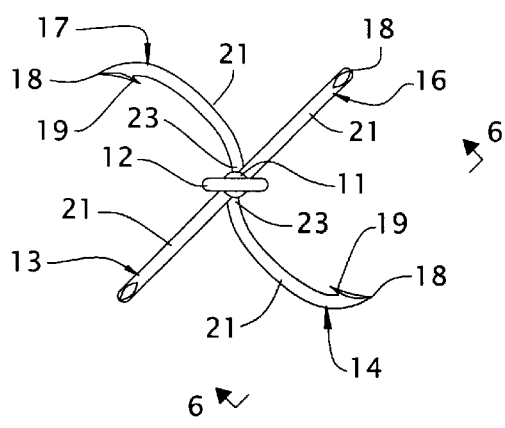
FIG. 5 is a top plan view of an alternate embodiment of the present invention.
Figure 6:
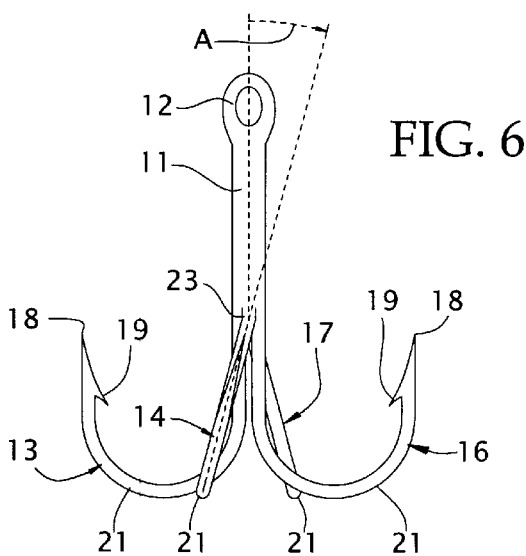
FIG. 6 is a side view along line 6—6 of FIG. 5.

Each prong has a hook point 18 with a barb 19 and a bight portion 21. Bight portions 21 of prongs 14 and 17 are rotated such that hook points 18 of prongs 14 and 17 are aligned between about 10–25 degrees from the longitudinal axis of shank 11, the angle of offset being designated by "A" in FIGS. 4 and 6. Prongs 13 and 16 are aligned 180 degrees such that prongs 13 and 16 are in substantially a single plane with each other as well as in a single plane with the longitudinal axis of shank 11, best illustrated in FIG. 2. Prongs 14 and 17 are also aligned 180 degrees; however, because of the offset position, prongs 14 and 17 are not in a single plane with each other, nor with the longitudinal axis of shank 11. FIGS. 3 and 4 illustrate the present invention wherein prongs 14 and 17 are rotated at a mid-bight position 22. FIGS. 5 and 6 illustrate an alternate embodiment wherein prongs 14 and 17 are rotated at a position 23 where the prong splits from the shank. Eyelet 12 is positioned relative to prongs 13, 14, 16, and 17 such that eyelet 12 is not in the same plane with any of the prongs, best illustrated in FIGS. 3 and 5. This equalizes the pressure on any hook point 18 when the fish hook is struck by a fish. Additionally, shank 11 has an enlarged diameter to increase the hooking and holding strength of the fish hook.

The standard hook and the offset hook complement each other to enhance the feature of preventing a hooked fish from expelling the hook. When at least one of each type of hook is implanted, the barbs are implanted in different planes. This makes it very difficult for the fish to expel the fish hook. With the fish hook designed with alternating planar bights and offset bights, the likelihood of a fish having both types of hooks implanted is greatly increased. Although we have described the invention as having hooks offset in a counterclockwise manner, the hooks could be offset in a clockwise manner as well. Additionally, the four pronged fish hook of the present invention is only a preferred embodiment thereof. The fish hook can have any multiple of alternating planar hooks and offset hooks.

It is to be understood that the form of the invention shown is a preferred embodiment thereof and that various changes and modifications may be made therein without departing from the spirit of the invention or scope as defined in the following claims.

Having set forth the nature of the invention, what is claimed is:

1. An improved four-pronged fish hook comprising:
   (a) an eyelet for attaching a fishing line to said fish hook;
   (b) a shank having first and second ends, wherein said eyelet is formed on said first end; and
   (c) alternating planar bights and offset bights extending from said second end of said shank to form upturned hooks therefrom, wherein a longitudinal axis through each of said upturned hooks on said planar bights is in a plane with a longitudinal axis through said shank and a longitudinal axis through each of said upturned hooks on said offset bights is in a plane which extends between about 10–25 degrees from said longitudinal axis through said shank.

2. An improved four-pronged fish hook as described in claim 1, wherein said shank has an enlarged diameter for greater hooking and holding strength.

3. An improved fish hook as described in claim 1, wherein said eyelet is substantially planar.

4. An improved fish hook as described in claim 3, wherein said eyelet is positioned relative to said planar bights and said offset bights such that said eyelet is not in the same plane with any of said planar bights and said offset bights.

5. An improved fish hook as described in claim 1, wherein said fish hook has an equal number of planar bights and offset bights.

6. An improved fish hook as described in claim 5, wherein said fish hook has at least two planar bights.

7. An improved fish hook comprising an eyelet for attaching a fishing line to said fish hooks a shank having first and second ends wherein said eyelet is formed on said first end, and alternating planar bights and offset bights extending from said second end of said shank to form upturned hooks, wherein each of said planar bights is in a same plane as a longitudinal axis through said shank and each of said offset bights is rotated such that a longitudinal axis through each of said upturned hooks on said offset bights is in a plane which extends between about 10–25 degrees from said longitudinal axis through said shank.

8. An improved fish hook as described in claim 7, wherein said shank has an enlarged diameter for greater hooking and holding strength.

9. An improved fish hook as described in claim 5, wherein said eyelet is substantially planar.

10. An improved fish hook as described in claim 9, wherein said eyelet is positioned relative to said planar bights and said offset bights such that said eyelet is not in the same plane with any of said planar bights and said offset bights.

11. An improved fish hook as described in claim 7, wherein said fish hook has an equal number of planar bights and offset bights.

12. An improved fish hook as described in claim 11, wherein said fish hook has at least two planar bights.

13. An improved four-pronged fish hook comprising:

(a) a substantially planar eyelet for attaching a fishing line to said fish hook;

(b) a shank having first and second ends, wherein said eyelet is formed on said first end; and (c) alternating planar bights and offset bights extending from said second end of said shank to form upturned hooks therefrom, wherein a longitudinal axis through each of said upturned hooks on said planar bights is in a plane with a longitudinal axis through said shank and a longitudinal axis through each of said upturned hooks on said offset bights is in a plane which extends at an angle to said longitudinal axis through said shank, wherein said eyelet is positioned relative to said planar bights and said offset bights such that said eyelet is not in the same plane with any of said planar bights and said offset bights.

14. An improved fish hook as described in claim 13, wherein said fish hook has an equal number of planar bights and offset bights.

15. An improved fish hook as described in claim 14, wherein said fish hook has at least two planar bights.

\* \* \* \* \*